(12) United States Patent
Torisawa

(10) Patent No.: US 7,048,445 B2
(45) Date of Patent: May 23, 2006

(54) CYLINDRICAL ROLLER BEARING

(75) Inventor: Hideto Torisawa, Kuwana (JP)

(73) Assignee: NTN Corporation, Osaka-Fu (JP)

( * ) Notice: Subject to any disclaimer, the term of this patent is extended or adjusted under 35 U.S.C. 154(b) by 175 days.

(21) Appl. No.: 10/773,558

(22) Filed: Feb. 6, 2004

(65) Prior Publication Data

US 2004/0184692 A1    Sep. 23, 2004

(30) Foreign Application Priority Data

Feb. 18, 2003    (JP)    ............................. 2003-040077

(51) Int. Cl.
*F16C 33/34*    (2006.01)
(52) U.S. Cl. ...................................... 384/450; 384/565
(58) Field of Classification Search ................ 384/450, 384/564, 565, 569
See application file for complete search history.

(56) References Cited

U.S. PATENT DOCUMENTS

| | | | | |
|---|---|---|---|---|
| 6,086,262 | A * | 7/2000 | Matsumoto | 384/569 |
| 6,379,049 | B1 * | 4/2002 | Shibazaki et al. | 384/450 |
| 6,530,693 | B1 * | 3/2003 | Ijuin et al. | 384/450 |
| 6,702,471 | B1 * | 3/2004 | Sakoda et al. | 384/450 |
| 6,767,134 | B1 * | 7/2004 | Murai et al. | 384/565 |

FOREIGN PATENT DOCUMENTS

| | | |
|---|---|---|
| JP | 52-079156 | 7/1977 |
| JP | 07-012119 | 1/1995 |

* cited by examiner

*Primary Examiner*—Thomas R. Hannon
(74) *Attorney, Agent, or Firm*—J.C. Patents

(57) ABSTRACT

A cylindrical roller bearing suited for higher rotation speeds is provided, which can control heat generation, wearing, and other problems at contact portions between cylindrical rollers and flange portions. A cylindrical roller bearing is composed of an inner ring having a raceway on an outer circumference thereof, an outer ring having a raceway on an inner circumference thereof, a plurality of cylindrical rollers disposed to roll freely between the raceway of the inner ring and the raceway of the outer ring, flange portions formed on both sides of the raceway of the inner ring, and recess grooves formed between flange surfaces of the flange portions on both sides and the raceway. The flange surfaces are inclined at the same angle from a base end portion to a tip end portion thereof. A radial dimension of chamfers of the cylindrical rollers is smaller than a radial height from the raceway near the recess grooves formed in the races. Curved portions are formed at a portion of the end surfaces of the cylindrical rollers close to the outer circumferential edge of the end surfaces.

4 Claims, 10 Drawing Sheets

# CYLINDRICAL ROLLER BEARING

BACKGROUND OF THE INVENTION

1. Field of the Invention

The present invention relates to a cylindrical roller bearing. In particular, it relates to a cylindrical roller bearing favorably incorporated in machine tools, engines such as jet engines or gas turbines, and other applications, to support a high-speed rotating shaft.

2. Description of the Related Art

There are many cases where the main spindle assembly of a machine tool such as a machining center, a CNC lathe or milling machine, etc. is driven at high rotation for reasons including improvement of work processing efficiency and precision. There is especially a marked recent trend toward increasing the main spindle rotation speed.

Generally, the main spindle of the main spindle assembly of a machine tool is supported to be freely rotatable with respect to a housing by a rolling contact bearing. The rolling contact bearing is lubricated by oil mist lubrication, air/oil lubrication, jet lubrication, grease lubrication, or other such method in response to the conditions under which it is being used among other factors. Cylindrical roller bearings, angular contact ball bearings, etc. are used for rolling contact bearings.

Cylindrical roller bearings are generally composed of an inner ring having a raceway on an outer circumference thereof, an outer ring having a raceway on an inner circumference thereof, a plurality of cylindrical rollers disposed to roll freely between the respective raceways of the inner ring and the outer ring, and a cage maintaining the cylindrical rollers spaced equally apart in the circumferential direction.

When flange portions are formed at both sides of the inner ring, recess grooves are respectively located at corner portions where flange surfaces of each of the flange portions of the inner ring and the raceway meet. The recess grooves are mainly formed as undercut grooves during grinding of the raceways and the flange surfaces. Chamfers are located at angle portions where roller surfaces and both end surfaces of the cylindrical rollers meet respectively. Further, an axial dimension between the flange surfaces facing in the axial direction is set slightly larger than the length of the cylindrical rollers, and thus a guide clearance is maintained between the cylindrical rollers and the flange portions.

Since the roller surfaces of the cylindrical rollers and the raceways of the races (inner and outer rings) are in line contact, a cylindrical roller bearing such as has been described has a high ability to handle radial load, and is suited for high-speed rotation. In contrast, when compared to a ball bearing, the amount of heat generated during high-speed rotation is large, and particularly, a problem exists where increase in heat generated, wear at portions where there is sliding contact between the cylindrical rollers and the flange portions, and other effects occur easily.

Specifically, the cylindrical rollers have a degree of freedom in inclination as large as the aforementioned guide clearance, and during rotation of the bearing, an unavoidable phenomenon occurs where the axes of the cylindrical rollers incline relative to the axis of the bearing, i.e., skew. When the cylindrical rollers skew, an axial direction component is generated in driving force provided by the raceway on the revolving side, this becoming an axial thrust F to push end portions of the cylindrical rollers against one of the flange portions. Thus, there are instances of frictional resistance increasing at regions where there is sliding contact between the cylindrical rollers and the flange portion, and the end portions of the cylindrical rollers and the flange portion thereby generate heat and suffer wear.

With respect to this problem, various methods of improvement have been suggested in the related art. For example, there are designs where the state of lubrication at the aforementioned portions of sliding contact is improved by designing the recess grooves with a larger height than the height of the chamfers of the cylindrical rollers and forming expanding tapered surfaces on the flange faces with a predetermined angle outward in the axial direction (for example, Japanese Patent Publication No. Sho 58-43609).

Also, there are designs that by having a structure wherein when the cylindrical rollers have skewed, by the outer circumferential edge portions of both end surfaces of the cylindrical rollers contacting with a portion nearer to the base end than the tip edges of the flange surfaces, the edge load of the portions of sliding contact is smaller compared to when the outer circumferential edge portions of both end surfaces of the cylindrical rollers contact with the tip edges of the flange surfaces (for example, Japanese Patent Laid-Open Publication No. Hei 7-12119).

As has been discussed, the cylindrical rollers have a degree of freedom in inclination as large as the guide clearance, and during rotation of the bearing, the cylindrical rollers rotate on their own axes as well as revolve about a shaft while their attitudes are ever-changing within a range of a maximum skew angle $\theta_{MAX}$. The maximum skew angle $\theta_{MAX}$ here means a state where the outer circumferential edge portions of both end surfaces of the cylindrical rollers contact with the flange portions of both sides of the raceway, being at the maximum skew angle within the total degree of freedom of the skew angle of the cylindrical rollers.

As shown in FIG. 10, when cylindrical rollers 23 skew at a skew angle $\theta$ less than the maximum skew angle $\theta_{MAX}$, the cylindrical rollers 23 are pushed in one direction axially by the previously mentioned axial thrust F, and roll while being guided in a state where they are pushed against one of the flange portions 21b. In this case, the state of contact between the cylindrical rollers 23 and one of the flange portions 21b changes according to the skew angle $\theta$ ($0<\theta_T<\theta_U<\theta_{MAX}$) in the following manner.

In the range where the skew angle $\theta$ is $0<\theta \leq \theta_T$, as shown in FIG. 11, a first boundary $R_{13}$ between end surfaces 23b and chamfers 23c of the cylindrical rollers 23 contacts a second boundary $R_{11}$ between flange surfaces $21b_1$ and recess grooves 21c (contact point shown by a black "●"). Then, in the range where the skew angle $\theta$ is $\theta_T<\theta<\theta_U$, as shown in FIG. 12, the first boundary $R_{13}$ between the end surfaces 23b and the chamfers 23c of the cylindrical rollers 23 contacts the flange surfaces $21b_1$ (contact point shown by a black " "). As the skew angle $\theta$ next approaches $\theta_U$, the first boundary $R_{13}$ between the end surfaces 23b and the chamfers 23c of the cylindrical rollers 23 contacts with a third boundary $R_{12}$ between the flange surfaces $21b_1$ and flange chamfers $21b_3$ (not shown in the drawings). After this, both end portions of the cylindrical rollers 23 contact with both of the flange portions 21b respectively to attain the maximum skew angle $\theta_{MAX}$ (not shown in the drawings).

FIG. 13 shows the relation between the skew angle $\theta$ of the cylindrical rollers 23 and the pressure P at the contact surface of the cylindrical rollers 23 and the flange portions 21b (solid line), and also shows the relationship of the axial thrust F acting on the cylindrical rollers 23 (broken line). As shown by the same drawing, the axial thrust F becomes larger accompanying an increase in the skew angle $\theta$.

Within the range of $0<\theta \leq \theta_T$, a phenomenon occurs where the pressure P at the contact surface increases at a comparatively steep gradient accompanying an increase in the skew angle θ. This is related to the cylindrical rollers 23 and one of the flange portions 21b contacting at the first boundary $R_{13}$ and the second boundary $R_{11}$ (the state shown in FIG. 11), and the axial thrust F becoming larger accompanying an increase in the skew angle θ. Particularly, it has been verified through testing that the pressure P at the contact surface becomes greater than a surface pressure level $P_0$ where wear occurs at the regions of contact thereof in the range $\theta_o \leq \theta \leq \theta_T$ (region shown by cross-hatching in the same drawing).

When the skew angle θ exceeds $\theta_T$, the pressure P at the contact surface decreases to a value below the surface pressure level $P_0$ where wear occurs at the portions of contact between the cylindrical rollers 23 and one of the flange portions 21b, after which a stable transition is shown at a comparatively low value irrespective of an increase in the skew angle θ. This is related to a move in the state of contact between the cylindrical rollers 23 and one of the flange portions 21b from contact between the first boundary $R_{13}$ and the second boundary $R_{11}$ (the state shown in FIG. 11) to contact between the first boundary $R_{13}$ and one of the flange surfaces $21b_1$ (the state shown in FIG. 12).

As the skew angle θ approaches $\theta_U$, as shown in FIG. 13, the pressure P at the contact surface once again begins a steep increase, and becomes a value exceeding the surface pressure level $P_0$ at the point where $\theta_U$ has been reached. This is related to the state of contact between the cylindrical rollers 23 and one of the flange portions 21b moving from contact between the first boundary $R_{13}$ and the flange surfaces $21b_1$ (the state shown in FIG. 12) to a state of contact between the first boundary $R_{13}$ and the third boundary $R_{12}$.

As previously explained, the pressure P at the contact surface of the cylindrical rollers and the flange portions is at a value exceeding the surface pressure level $P_0$ where wear occurs at the portions of contact between the cylindrical rollers 23 and the flange portions 21b at the stage before reaching the maximum skew angle $\theta_{MAX}$, that is, in the range where the skew angle θ is $\theta_0 \leq \theta \leq \theta_T$, $\theta_U \leq \theta_{<\theta MAX}$. This is thought to be a major factor contributing to such problems as heat generation and wear at the contact portions.

However, the invention disclosed in Japanese Patent Publication No. Sho 58-43609 previously discussed makes no recognition of the aforementioned phenomenon, and does not suggest a way for improving it. Likewise, the invention disclosed in Japanese Patent Laid-Open Publication No. Hei 7-12119 restricts the state of contact between the outer circumferential edge portions of both end surfaces of the cylindrical rollers and the flange surfaces at the maximum skew angle $\theta_{MAX}$, and there is no recognition of the discussed heat generation, wear, or other problems occurring at the stage $\theta_0 \leq \theta \leq \theta_T$, and does not suggest a means for improvement.

The discussed heat generation, wear, and other problems occurring at the stage $\theta_0 \leq \theta \leq \theta_T$ occur easily in instances where a cylindrical roller bearing formed having flange portions only on one of the inner and outer rings (e.g., NU type, N type, etc.) is driven at high speeds with negative radial internal clearance (preload condition). Cylindrical roller bearings formed having flange portions only on one of the inner and outer rings do not handle axial load, and thus the skew of the cylindrical rollers occurs as a result of such factors as misalignment during bearing installation and slight imperfections in the shape of the raceways of the bearings. The skew angle thereof is therefore only slight with a high probability of being $\theta_0 \leq \theta \leq \theta_T$, and surface pressure at the contact portions between the cylindrical rollers and one of the flange portions becoming a value larger than the surface pressure level $P_0$ where wear occurs is a frequent state, which has been verified through testing. Further, heat generation, wear, etc. progresses easily when driven at high speeds, since the sliding speed at the portions where there is contact between the cylindrical rollers and the flange portions is high.

SUMMARY OF THE INVENTION

The present invention aims to improve a cylindrical roller bearing in light of the above knowledge.

Specifically, the task of the present invention is to provide a cylindrical roller bearing suitable for higher rotation speeds which controls heat generation, wear, and other effects at the end portions of the cylindrical rollers and the flange portions by decreasing the pressure at the contact surface between the cylindrical rollers and the flange portions, in particular the pressure at the contact surface within a range where the skew angle of the cylindrical rollers is $\theta_0 \leq \theta \leq \theta_T$.

A cylindrical roller bearing of the present invention comprises an inner ring having a raceway on an outer circumference thereof, an outer ring having a raceway on an inner circumference thereof, a plurality of cylindrical rollers disposed to roll freely between the raceway of the inner ring and the raceway of the outer ring, flange portions being disposed on both sides respectively of the raceway of at least one of the inner ring and the outer ring, and a recess groove disposed at a corner portion where a flange surface of at least one of the flange portions of both sides and the raceway meet, the flange surfaces being inclined at the same angle from a base end portion to a tip end portion thereof, a radial dimension $h_3$ of chamfers formed on outer circumferential edge portions of the cylindrical rollers being set smaller than a radial height $h_1$ from the raceway near the recess groove, curved portions being formed between the chamfers and end surfaces of the cylindrical rollers.

Curved portions, here, refer to the outer circumferential edge portions at the end surfaces of the cylindrical rollers being arc-shaped in cross section, the curvature radius of the arc thereof having a gradually changing shape along the radial direction. Further, in forming the curved portions, processing wherein a flexible hone contacts in a slightly inclined state with respect to the end surfaces of the cylindrical rollers is preferable.

The curved portions are regulated to be a shape wherein the following expressions are satisfied:

$$0.8 \leq h_2/h_1$$

$$1 \leq \tan^{-1}[\delta/(h_2-h_3)](°)$$

where $h_1$ is a radial height from the raceway near the recess groove, $h_2$ is a radial dimension from the roller surfaces of the cylindrical rollers to a boundary between the curved portions and the end surfaces, $h_3$ is a radial dimension of the chamfers of the cylindrical rollers, and δ is an axial dimension from a boundary between the chamfers and the curved portions to the end surfaces of the cylindrical rollers.

By the present invention possessing the aforementioned structure, problems occurring in the related art when the skew angle falls within the range $\theta_0 \leq \theta \leq \theta_T$, that is, the phenomenon of the boundary between the end surfaces and the chamfers of the cylindrical rollers contacting with the boundary between the flange surfaces and the recess grooves, can be avoided. Therefore, generation of heat, wear, etc. at the end portions of the cylindrical rollers and the flange portions can be prevented. A cylindrical roller bearing suited to higher rotation speeds can be provided, especially, a favorable cylindrical roller bearing for a main spindle assembly of a machine tool driven at higher rotation speeds.

DETAILED DESCRIPTION OF THE PREFERRED EMBODIMENTS

Figure 2:
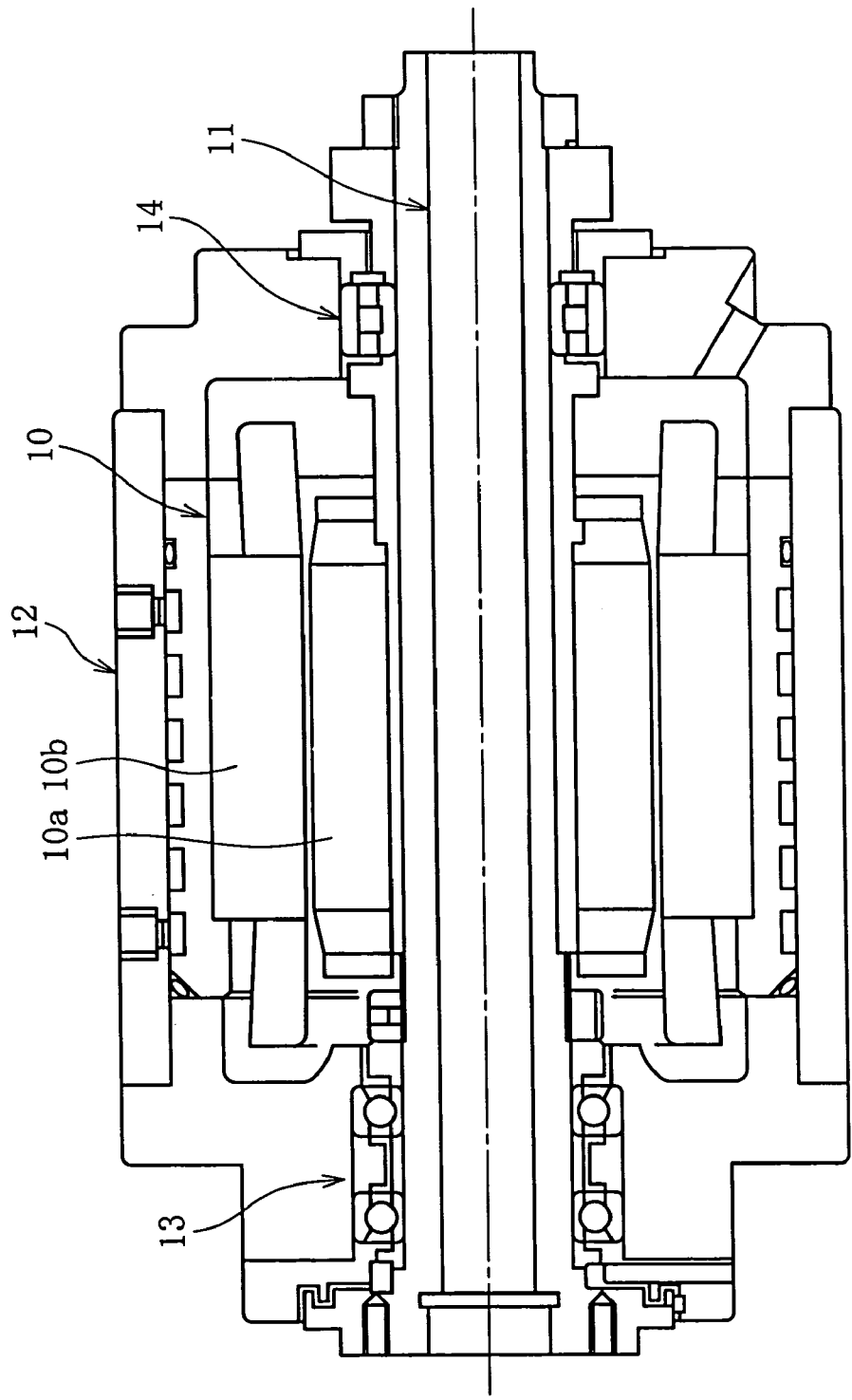
FIG. 2 is a cross-sectional view showing a structural example of a main spindle assembly of a machine tool.

FIG. 2 shows a structural example of a main spindle assembly of a machine tool such as a machining center or a grinding machine. The main spindle assembly shown in the same drawing is referred to as a built-in type, and is configured to rotatingly drive a main spindle 11 at high speed by an internal motor 10. The motor 10 is disposed in the axial central portion of the main spindle assembly, and comprises a rotor 10a disposed on the outer circumference of the main spindle 11 and a stator 10b disposed on the inner circumference of a housing 12. When electric power is supplied to the stator 10b, exciting power is generated between the stator 10b and the rotor 10a, and the main spindle 11 is rotatingly driven at high speed by the exciting power.

Rotation of the main spindle 11 is supported to be freely rotatable relative to the housing 12 by rolling contact bearings disposed respectively at a front end (tool end) and a rear end (opposite to the tool end) sandwiching the motor 10. Normally, the rolling contact bearing at the rear end is structured to enable displacement in the axial direction (free end), to absorb or let escape the amount by which the main spindle 11 axially expands due to heat during driving. In this example, matched mountings angular contact ball bearings (a pair of angular contact ball bearings) 13 are used as rolling contact bearings for the front end, and a single-row cylindrical roller bearing 14 is used as a rolling contact bearing for the rear end.

Figure 3:
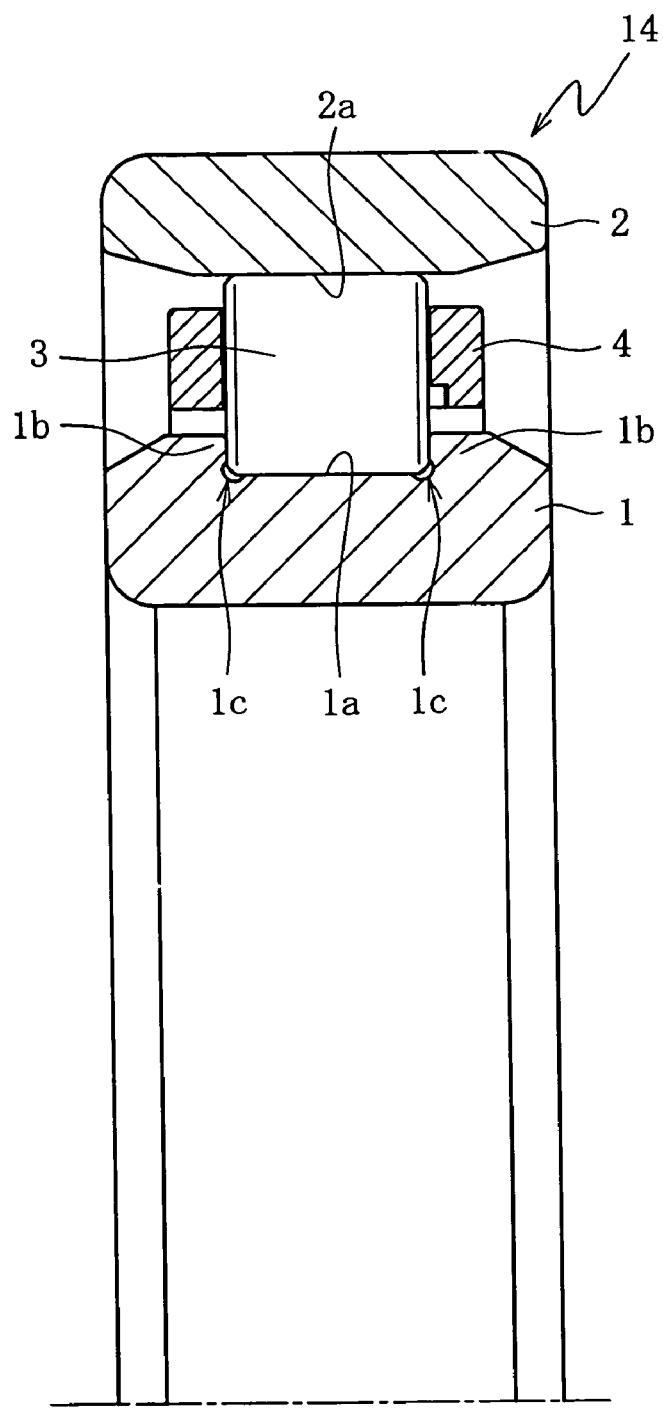
FIG. 3 is a cross-sectional view including partially omitted portions showing a cylindrical roller bearing according to an embodiment of the present invention.

FIG. 3 shows the cylindrical roller bearing 14 disposed at the rear end. The cylindrical roller bearing 14 comprises an inner ring 1 having a raceway 1a on the outer circumference thereof, an outer ring 2 having a raceway 2a on the inner circumference thereof, a plurality of cylindrical rollers 3 disposed to roll freely between the raceway 1a of the inner ring 1 and the raceway 2a of the outer ring 2, and a cage 4 holding the cylindrical rollers 3 spaced equally apart in the circumferential direction. Flange portions 1b are disposed on both sides respectively of the raceway 1a of the inner ring 1. The cage 4 can be formed from resin material.

The inner ring 1 and the outer ring 2 of the cylindrical roller bearing 14 are fitted to the outer circumference of the main spindle 11 and the inner circumference of the housing 12, respectively. A radial internal clearance during driving is for example a negative clearance. The internal parts of the bearing are lubricated by a method such as oil mist lubrication, air/oil lubrication, jet lubrication, or grease lubrication.

When the main spindle 11 is rotatingly driven at high speed by the motor 10 contained within the main spindle assembly, the rotation thereof is supported to be freely rotatable relative to the housing 12 by the angular contact ball bearings 13 at the front end and the cylindrical roller bearing 14 at the rear end. When the main spindle 11 undergoes expansion due to heat in the axial direction owing to a temperature rise during driving, the amount of expansion axially thereof is absorbed or allowed to escape by sliding displacement between the outer ring 2 and the cylindrical rollers 3 of the cylindrical roller bearing 14.

Further, when the present invention is applied to a single-row cylindrical roller bearing, application is possible to various known bearing types, including N type (two inner-ring flanges), NU type (two outer-ring flanges), NF type (two inner-ring flanges, one outer-ring flange), NJ type (one inner-ring flange, two outer-ring flanges), or NUP type (one of two inner-ring flanges is separable, two outer-ring flanges). In an instance where the flange portion is separable, undercut grooves are sometimes not formed in the corner portions between the flange surfaces and the raceways thereof. The present invention can also be applied to double-row or multi-row cylindrical roller bearings. In such instances as well, various known bearing types can be adopted.

Figure 1:
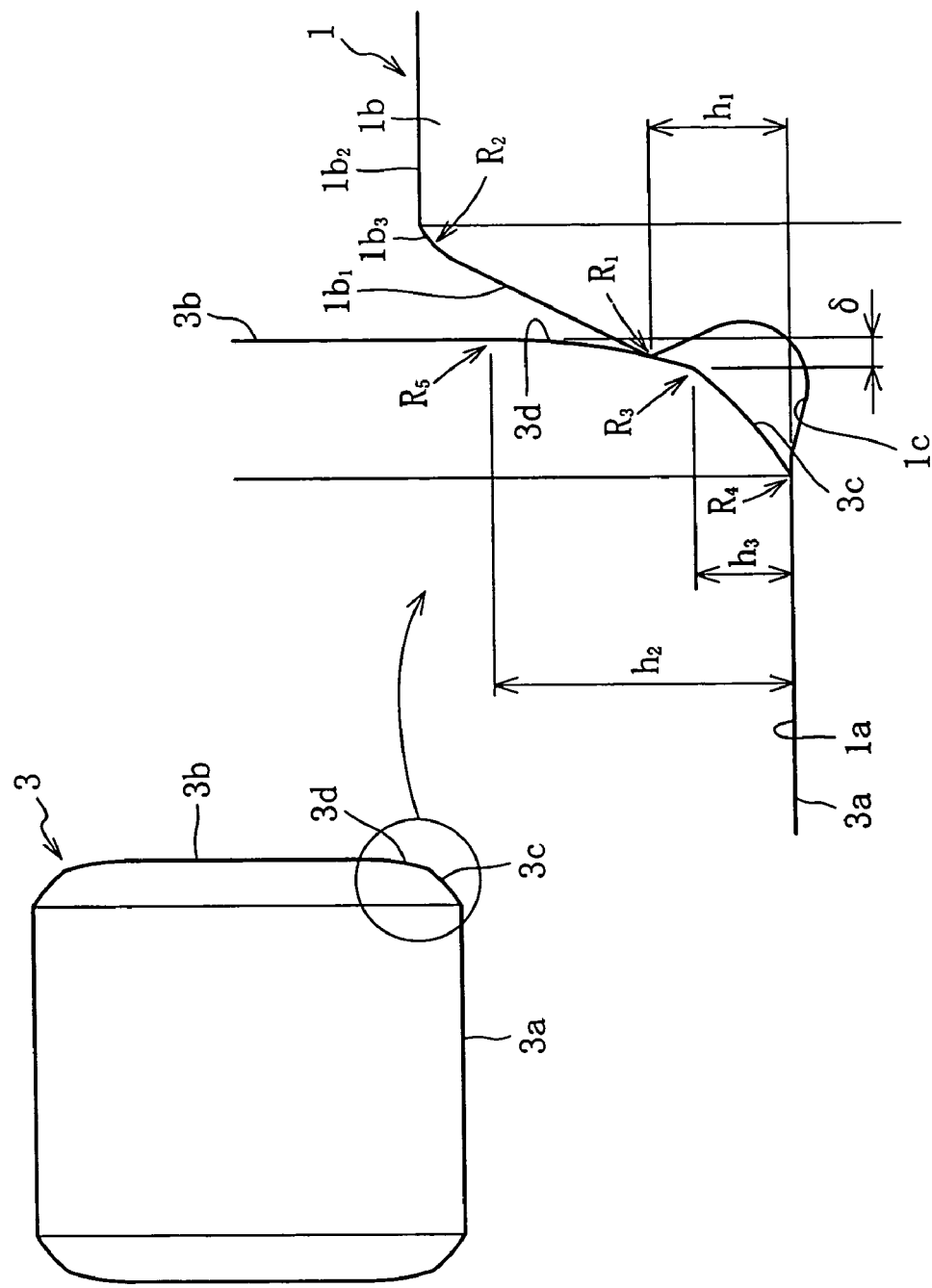
FIG. 1 is an enlarged cross-sectional view showing essential portions of a cylindrical roller and a raceway of an inner ring and a flange portion according to an embodiment of the present invention.

According to this embodiment, as shown in enlargement in FIG. 1, recess grooves $1c$ are formed at the corner portions where flange surfaces $1b_1$ of each of the flange portions $1b$ and the raceway $1a$ of the inner ring 1 meet respectively. The recess grooves $1c$ mainly are formed as undercut grooves during grinding of the raceway $1a$ and the flange surfaces $1b_1$. According to this embodiment, the flange surfaces $1b_1$ are tapered surfaces inclined in a direction so as to gradually open in a radially outward direction, and flange chamfers $1b_3$ are formed at angle portions where the flange surfaces $1b_1$ and outer radial surfaces $1b_2$ of the flange portions $1b$ meet.

Chamfers $3c$ are formed at the angle portions where roller surfaces $3a$ and both end surfaces $3b$ of the cylindrical rollers 3 meet respectively. A first radial dimension $h_3$ of the chamfers $3c$ formed on the outer circumferential edge portions of the cylindrical rollers 3 is set smaller than a radial height $h_1$ from the raceway $1a$ near the recess grooves $1c$. Further, curved portions $3d$ are formed between the chamfers $3c$ and the end surfaces $3b$ of the cylindrical rollers 3.

The radial height $h_1$ is the dimension from the location of the raceway $1a$ of the inner ring 1 to a first boundary $R_1$ between the recess grooves $1c$ and the flange surfaces $1b_1$. A second radial dimension $h_2$ is the dimension from the location of a second boundary $R_4$ between the roller surfaces $3a$ and the chamfers $3c$ to a third boundary $R_5$ between the curved portions $3d$ and the end surfaces $3b$ of the cylindrical rollers 3. The first radial dimension $h_3$ is the dimension from the location of the second boundary $R_4$ between the roller surfaces $3a$ and the chamfers $3c$ to a fourth boundary $R_3$ between the chamfers $3c$ and the curved portions $3d$. Further, it is preferable that boundaries $R_1$ through $R_5$ be formed with curved surfaces to decrease pressure at the contact surface, for example, with arcuate surfaces having a curvature radius of 0.1 to 0.3 mm, to form a smooth continuation with adjacent surfaces.

The reason for setting the first radial dimension $h_3$ of the chamfers $3c$ of the cylindrical rollers 3 smaller than the radial height $h_1$ from the raceway $1a$ near the recess grooves $1c$ will now be explained.

Figure 12:
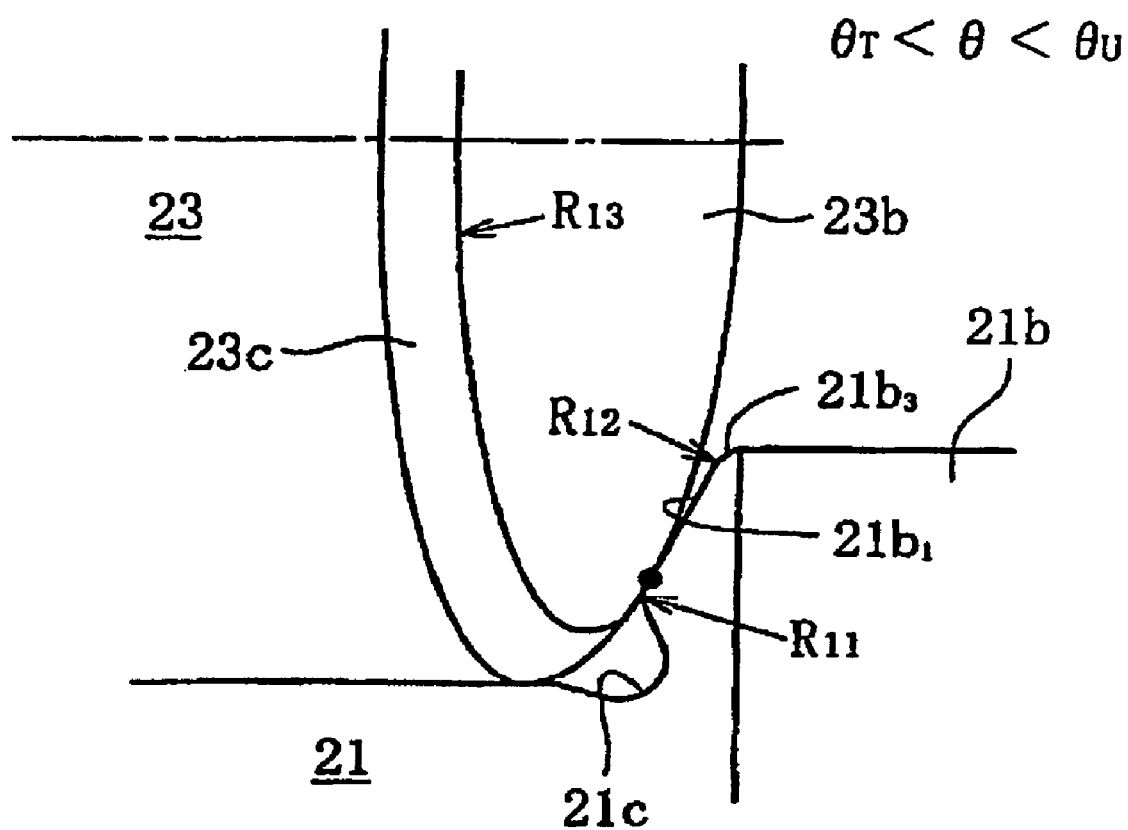
FIG. 12 is a view showing a state where a boundary between end surfaces and chamfers of cylindrical rollers contacts with a flange surface.
Figure 13:
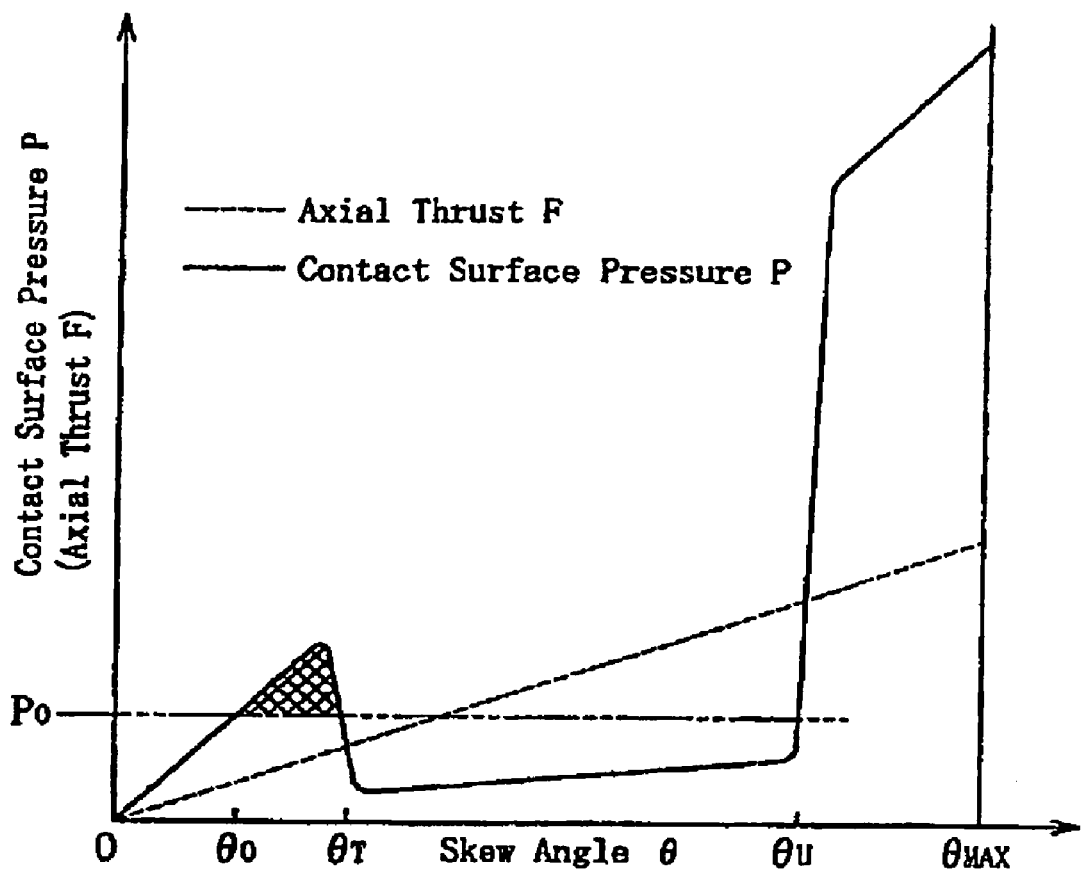
FIG. 13 is a graph showing a relationship between a skew angle θ of cylindrical rollers of a cylindrical roller bearing and a pressure P at the contact surface between the cylindrical rollers and the flange portions (solid line), as well as the relationship of an axial thrust F acting on the cylindrical rollers (broken line), according to the prior art.

For example, if the first radial dimension $h_3$ of the chamfers $3c$ of the cylindrical rollers 3 is set larger than the radial height $h_1$ from the raceway $1a$ near the recess grooves $1c$, as is the case with the cylindrical rollers 23 (see FIG. 12), the first boundary $R_{13}$ between the end surfaces $23b$ and the chamfers $23c$ thereof contacts with the flange surfaces $21b_1$ in a state where the cylindrical rollers 23 are not skewing. Normally, since the chamfers $23c$ are processed by forging, precision in the form of the first boundary $R_{13}$ is poor. It has been verified through testing that in a state where the cylindrical rollers 23 are not skewing, abnormal vibration occurs in the cylindrical rollers 23 when the first boundary $R_{13}$ with poor form precision contacts with the flange surfaces $21b_1$, and wear occurs at the first boundary $R_{13}$. Therefore, according to this embodiment, the first radial dimension $h_3$ of the chamfers $3c$ of the cylindrical rollers 3 is set smaller than the radial height $h_1$ from the raceway $1a$ near the recess grooves $1c$.

The previously mentioned curved portions $3d$ are regulated to satisfy the following conditions:

$$0.8 \leq h_2/h_1$$

$$1 \leq \tan^{-1}[\delta/(h_2-h_3)](°)$$

where $h_1$ is the radial height from the raceway $1a$ near the recess grooves $1c$, $h_2$ is the second radial dimension from the roller surfaces $3a$ of the cylindrical roller 3 to the third boundary $R_5$ between the curved portions $3d$ and the end surfaces $3b$, $h_3$ is the first radial dimension of the chamfers $3c$ of the cylindrical rollers 3, and $\delta$ is the axial dimension from the fourth boundary $R_3$ between the chamfers $3c$ and the curved portions $3d$ to the end surfaces $3b$ of the cylindrical rollers 3.

Figure 4:
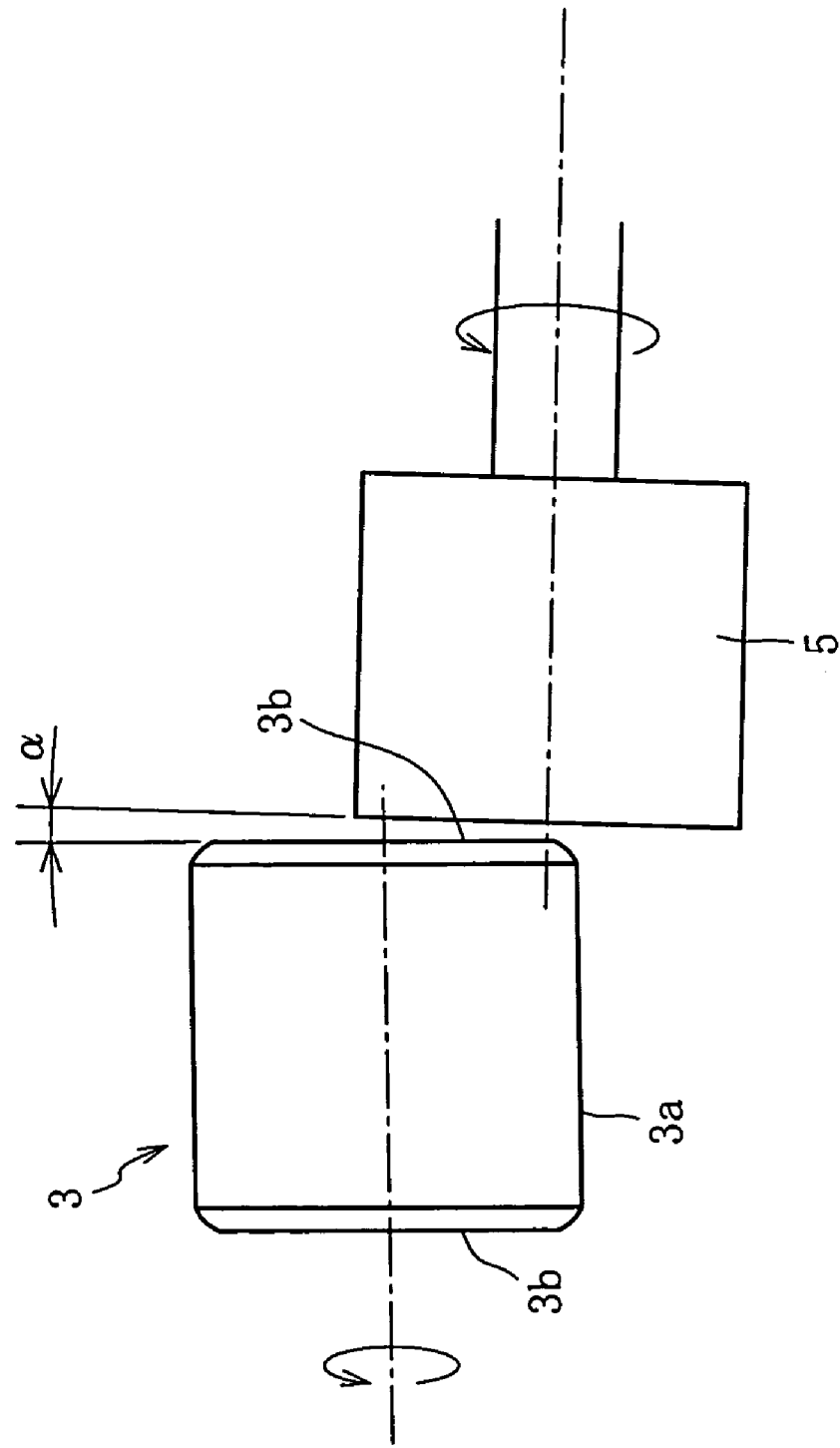
FIG. 4 is a view showing a cylindrical roller and a flexible hone.

Further, as shown in FIG. 4, the curved portions $3d$ can be made through processing wherein a flexible hone 5 is brought into contact therewith in an inclined state of only a slight angle α relative to the end surfaces $3b$ of the cylindrical rollers 3.

Figure 11:
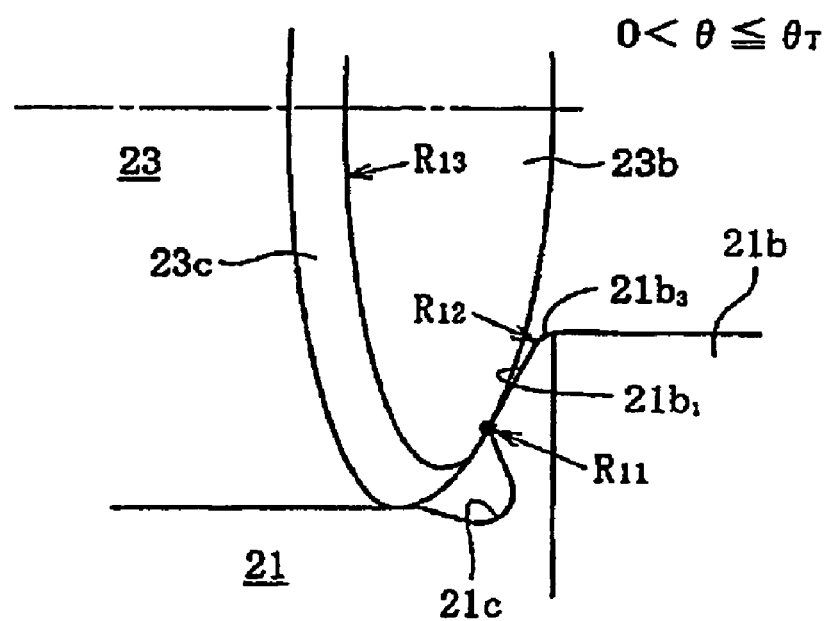
FIG. 11 is a view showing a state where a boundary between end surfaces and chamfers of cylindrical rollers contacts with a boundary between a flange surface and a recess groove.

By forming the curved portions $3d$ between the chamfers $3c$ and the end surfaces $3b$ of the cylindrical rollers 3, the problems of the prior art which occur when the skew angle θ falls within the range $0<\theta\leq\theta_T$ (including $\theta_0\leq\theta$), that is, the phenomenon of the first boundary $R_{13}$ between the end surfaces $23b$ and the chamfers $23c$ of the cylindrical rollers 23 contacting with the second boundary $R_{11}$ between the flange surfaces $21b_1$ and the recess grooves $21c$ (see FIG. 11) can be avoided. This will now be explained referring to FIGS. 5A to 5E.

Figure 5A:
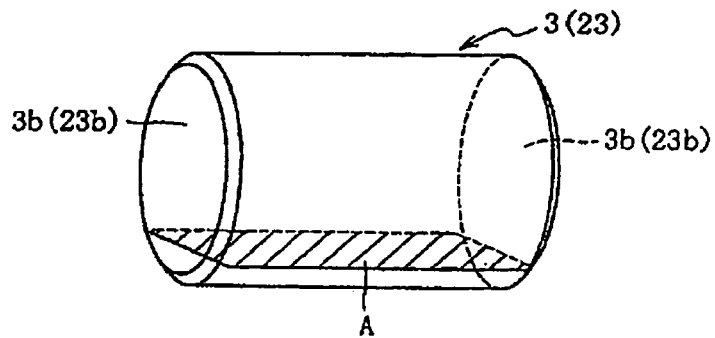
FIG. 5A is a view showing a cross-section when a cylindrical roller is cross-sectioned on the plane A.
Figure 5B:
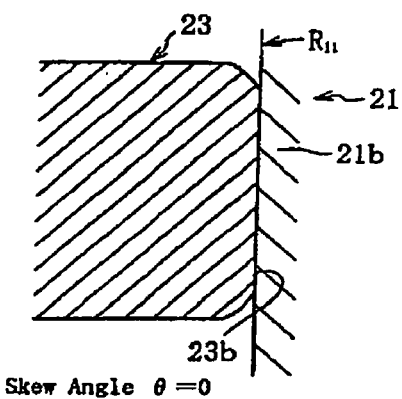
FIG. 5B is a view showing a state of contact between a cylindrical roller and a flange portion when a skew angle θ=0° according to an example of the prior art.
Figure 5C:
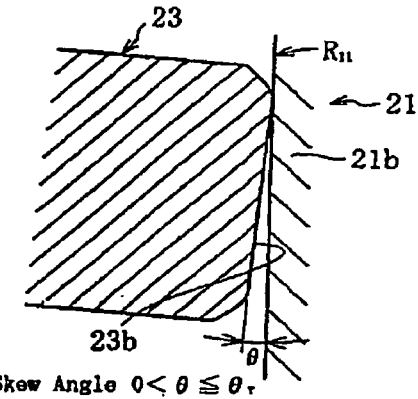
FIG. 5C is a view showing a state of contact between the cylindrical roller and the flange portion when the skew angle is 0<θ≦θ$_T$ according to the example of the prior art.
Figure 5D:
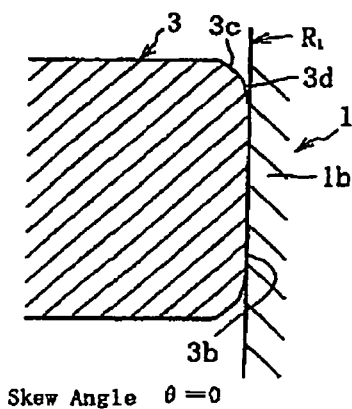
FIG. 5D is a view showing a state of contact between a cylindrical roller and a flange portion when the skew angle θ=0° according to an example of the present invention.
Figure 5E:
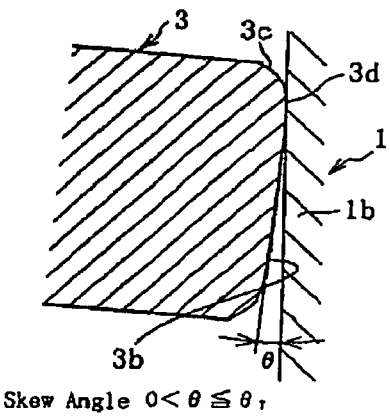
FIG. 5E is a view showing a state of contact between the cylindrical roller and the flange portion when the skew angle is 0<θ≦θ$_T$ according to the example of the present invention.

FIGS. 5B and 5C, as shown in FIG. 5A, show a cross section A of the cylindrical rollers 23 and the second boundary $R_{11}$ of an example of the prior art observed from a direction radially outside the bearing toward the bearing center. FIGS. 5D and 5E, as shown in FIG. 5A, show a cross section A of the cylindrical rollers 3 and the first boundary $R_1$ of the present invention observed from a direction radially outside the bearing toward the bearing center.

According to the example of the related art, as shown in FIGS. 5B and 5C, when the cylindrical rollers 23 skew in the range $0<\theta\leq\theta_T$ (including $\theta_0\leq\theta$), the first boundary $R_{13}$ between the end surfaces $23b$ and the chamfers $23c$ thereof contacts with the second boundary $R_{11}$ between the flange surfaces $21b_1$ and the recess grooves $21c$. In this instance, since both the edges of the cylindrical rollers 23 and the flange surfaces $21b$ are contacting, the pressure at the contact surface is large, with abnormal heat generation, wear, etc. occurring.

In contrast, according to the example of the present invention, as shown in FIGS. 5D and 5E, when the cylindrical rollers 3 skew within the range $0<\theta\leq\theta_T$ (including $\theta_0\leq\theta$), the curved portions $3d$ contact with the first boundary $R_1$ between the flange surfaces $1b_1$ and the recess grooves $1c$. In this instance, pressure at the contact surface is small since mutual contact between edge portions as with the example of the related art can be avoided, and abnormal heat generation, wear, etc. do not occur.

The reason for setting the conditions for forming the curved portions $3d$ as $0.8 \leq h_2/h_1, 1 \leq \tan^{-1}[\delta/(h_2-h_3)]°$ is as follows ($h_1$: radial height from the raceway $1a$ near the recess grooves $1c$; $h_2$: second radial dimension from the raceway $3a$ to the third boundary $R_5$ between the curved portions $3d$ and the end surfaces $3b$ of the cylindrical rollers 3; $h_3$: first radial dimension of the chamfers $3c$ of the cylindrical rollers 3; $\delta$: axial dimension from the fourth boundary $R_3$ between the chamfers 3c and the curved portions 3d to the end surfaces 3b of the cylindrical rollers 3).

Normally, the first radial dimension $h_3$ of the cylindrical rollers 3 is in a relationship with the radial height $h_1$ of about $0.5 \leq h_3/h_1 \leq 0.9$, and even in an instance of $h_3/h_1 = 0.5$, the lower limit value of $h_2/h_1$ is 0.8 so as to maintain the radial width $(h_2-h_3)$ of the curved portions 3d of the cylindrical rollers 3.

Figure 6:
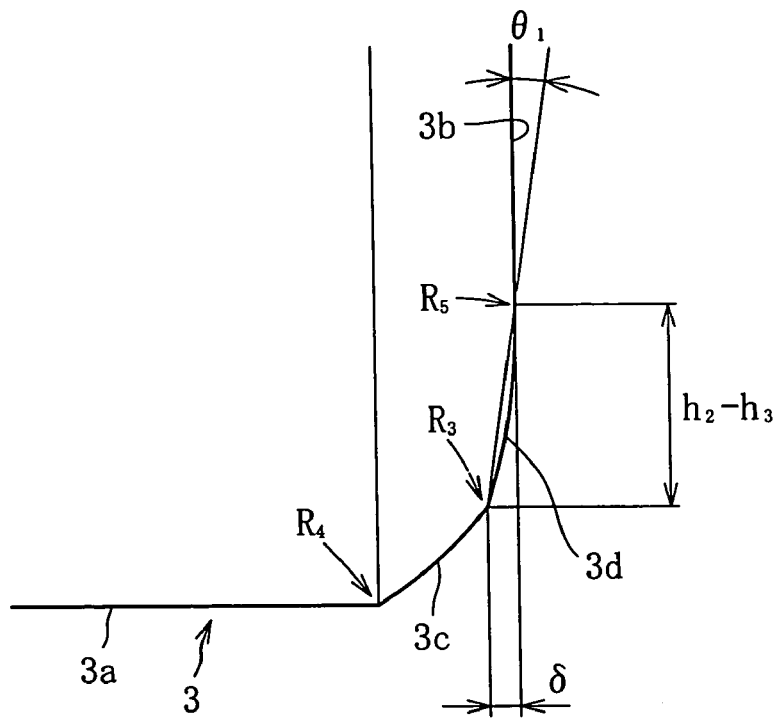
FIG. 6 is an enlarged view showing essential portions of a chamfer and a curved portion of a cylindrical roller according to an embodiment of the present invention.

Also, normally for cylindrical rollers 3, even at the maximum skew angle $\theta_{MAX}$ it is only an angle of approximately 0.5 to 1.0°, however, $1 \leq \tan^{-1}[\delta(h_2-h_3)]°$ is set such that the curved portions 3d will contact with the first boundary $R_1$ between the flange surfaces $1b_1$ and the recess grooves 1c when the cylindrical rollers 3 skew within a range of $0 < \theta \leq \theta_T$ (including $\theta_0 \leq \theta$) when an apex angle $\theta_1$ of a triangle formed by the radial width $(h_2-h_3)$ of the curved portions 3d of the cylindrical rollers 3 and the axial dimension $\delta$ (see FIG. 6) is 1° or greater. Verification was carried out with regard to this by the following test using manufactured products where $\tan^{-1}[\delta/(h_2-h_3)] = 1°$ is satisfied.

EMBODIMENTS

Test bearings for the examples of the prior art and the present invention were fabricated and were placed in a test apparatus. Driving operation was carried out under the hereinafter described conditions, wherein the relationship between number of revolutions and temperature increase was sought after, and the conditions of wear occurrence at the end portions of the cylindrical rollers was observed.

(Test Conditions)

Test bearings: single-row cylindrical roller bearing N1020 (prior art example, present invention example)

Number of revolutions: 2000 to 8000 rpm (maximum dn=80×10⁴)

internal clearance: −5 μm (radial internal clearance after assembly)

Lubrication: grease lubrication

Figure 7:
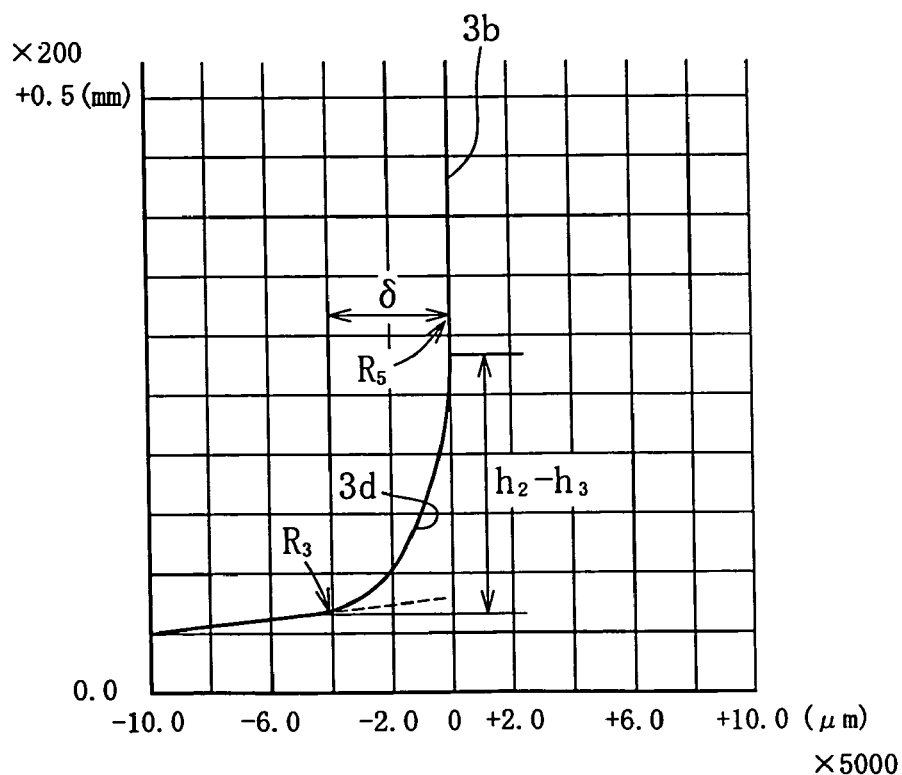
FIG. 7 is a graph showing shape dimensions of curved portions of cylindrical rollers according to an embodiment of the present invention.

Shape of curved portions 3d (see FIG. 7): $h_2/h_1 = 1.05$ $\tan^{-1}[\delta/(h_2-h_3)] = 1°$ (Test Results)

Figure 8:
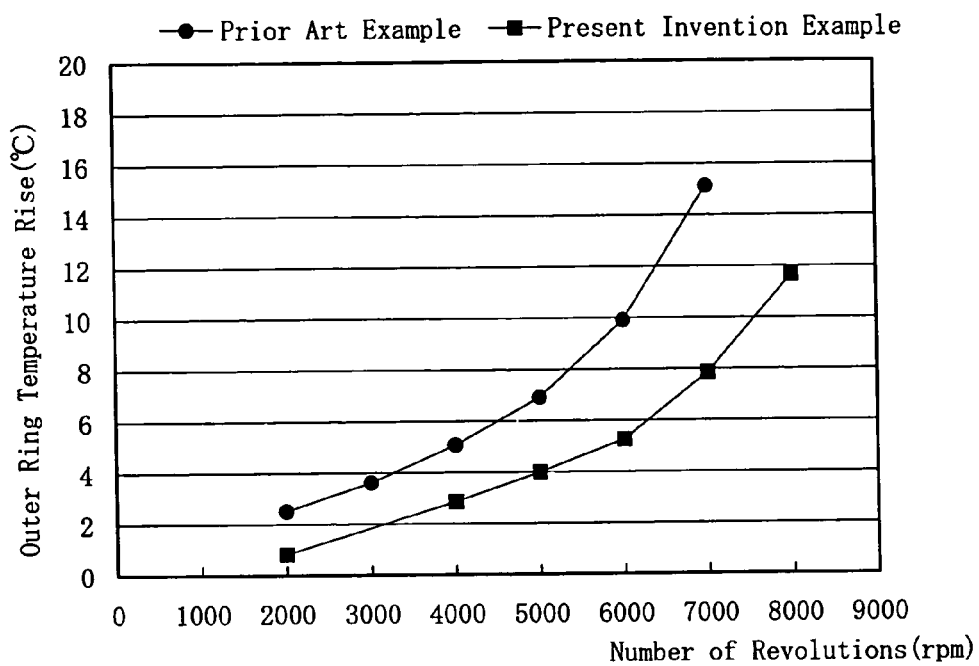
FIG. 8 is a characteristic graph of test results of embodiments showing the relationship between number of rotations and temperature increase.

Results of temperature increase with the example of the prior art and the example of the present invention are shown in FIG. 8. With the example of the prior art, temperature increase of the bearing is high, and also, the bearing temperature became unstable at 7000 rpm, and therefore the test could not be continued. Upon observing the bearing following the test, the occurrence of wear was verified at the first boundary $R_{13}$ between the end surfaces 23b and the chamfers 23c of the cylindrical rollers 23, and at the second boundary $R_{11}$ between the flange surfaces $21b_1$ and the recess grooves 21c of the inner ring 21.

Figure 9:
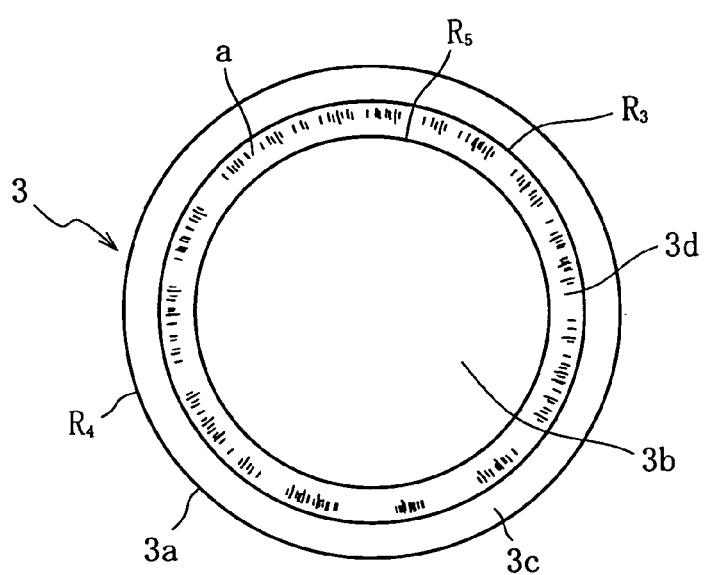
FIG. 9 is a view of an end surface of a cylindrical roller showing what are thought to be marks from slight contact with a flange portion on a curved portion, obtained as test results of an embodiment.
Figure 10:
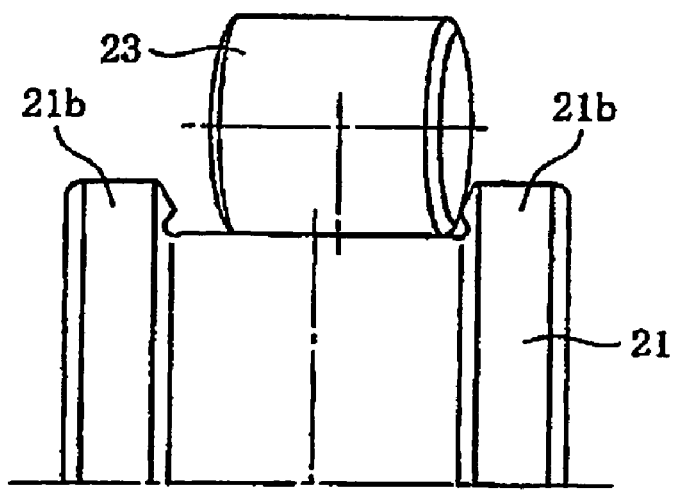
FIG. 10 is a view showing a state where cylindrical rollers skew at a skew angle θ less than a maximum skew angle θ$_{MAX}$, and are contacting with one of a pair of flange portions.

In contrast, with the example of the present invention, temperature increase of the bearing was low, and stable driving at 8000 rpm was possible. Driving operation was thus carried out for 1000 hours, after which the bearing was observed. Wear was not visible at the end surfaces 3b of the cylindrical rollers 3, with only what are thought to be contact marks a on the curved portions 3d resulting from slight contact with the flange portions 1b of the inner ring 1 (see FIG. 9), and thus effects of the present invention were verifiable. Moreover, effectiveness of the present invention when $\tan^{-1}[\delta/(h_2-h_3)] = 1°$ was satisfied was also verified. Therefore, the lower limit value of $\tan^{-1}[\delta/(h_2-h_3)]$ is set as 1.

What is claimed is:

1. A cylindrical roller bearing comprising:
   an inner ring having a raceway on an outer circumference thereof;
   an outer ring having a raceway on an inner circumference thereof;
   a plurality of cylindrical rollers disposed to roll freely between the raceway of the inner ring and the raceway of the outer ring;
   flange portions being disposed on both sides respectively of the raceway of at least one of the inner ring and the outer ring; and
   a recess groove disposed at a corner portion where a flange surface of at least one of the flange portions of both sides and the raceway meet, the flange surfaces being inclined at the same angle from a base end portion to a tip end portion thereof, wherein
   a radial dimension $h_3$ of chamfers formed on outer circumferential edge portions of the cylindrical rollers is set smaller than a radial height $h_1$ from the raceway near the recess groove, curved portions being formed between the chamfers and end surfaces of the cylindrical rollers, and
   the curved portions are regulated to be a shape wherein the following expressions are satisfied:

$0.8 \leq h_2/h_1$ $1 \leq \tan^{-1}[\delta/(h_2-h_3)](°)$ where $h_1$ is a radial height from the raceway near the recess groove, $h_2$ is a radial dimension from the roller surfaces of the cylindrical rollers to a boundary between the curved portions and the end surfaces, $h_3$ is a radial dimension of the chamfers of the cylindrical rollers, and $\delta$ is an axial dimension from a boundary between the chamfers and the curved portions to the end surfaces of the cylindrical rollers.

2. The cylindrical roller bearing according to claim 1, being incorporated in a main spindle assembly of a machine tool.

3. The cylindrical roller bearing according to claim 1, wherein the curved portions are formed by processing wherein a flexible hone contacts in a slightly inclined state with respect to the end surfaces of the cylindrical rollers.

4. The cylindrical roller bearing according to claim 3, being incorporated in a main spindle assembly of a machine tool.

* * * * *